(12) United States Patent
Lee et al.

(10) Patent No.: US 7,952,835 B2
(45) Date of Patent: May 31, 2011

(54) HEAD STACK ASSEMBLY WITH SUSPENSION SUPPORTING HEAD SLIDER AND HARD DISC DRIVE INCLUDING THE SAME

(75) Inventors: Haeng-soo Lee, Suwon-si (KR); Woo-sung Kim, Seoul (KR); Dong-ho Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 953 days.

(21) Appl. No.: 11/777,292

(22) Filed: Jul. 13, 2007

(65) Prior Publication Data
US 2008/0013216 A1    Jan. 17, 2008

(30) Foreign Application Priority Data

Jul. 13, 2006    (KR) .................. 10-2006-0065870

(51) Int. Cl.
*G11B 5/53*    (2006.01)
*G11B 21/16*    (2006.01)

(52) U.S. Cl. ................. 360/244.5; 360/244.8; 360/244.9
(58) Field of Classification Search ............... 360/244.5, 360/244.8, 244.9
See application file for complete search history.

(56) References Cited

U.S. PATENT DOCUMENTS

| | | | | |
|---|---|---|---|---|
| 6,462,910 | B1 * | 10/2002 | Shimizu et al. | 360/244.8 |
| 7,040,004 | B2 * | 5/2006 | Liem et al. | 29/603.03 |
| 7,136,260 | B2 * | 11/2006 | Oh et al. | 360/244.8 |
| 7,573,680 | B1 * | 8/2009 | Kulangara | 360/244.8 |
| 2005/0152070 | A1 | 7/2005 | Funabashi et al. | 29/603.03 |

FOREIGN PATENT DOCUMENTS

| | | |
|---|---|---|
| JP | 5-43356 U | 6/1993 |
| JP | 10-097773 | 4/1998 |
| JP | 2003-151232 | 5/2003 |

* cited by examiner

*Primary Examiner* — Julie Anne Watko
(74) *Attorney, Agent, or Firm* — Volentine & Whitt, PLLC

(57) ABSTRACT

A head stack assembly (HAS) of a hard disk drive (HDD) includes a swing arm, a connection plate integral with a terminal end of the swing arm, a head slider including a magnetic head for reading/writing data from/onto a disk, and a suspension that is attached to the connection plate, supports the head slider, and has characteristics which minimize the degree to which the magnetic head will run off-track due to vibrations induced in the HDD. The suspension includes two connecting parts having upper surfaces at which the suspension is attached to the connection plate. In the HDD, the upper surface of the connecting part positioned closest to the center of the disk center lies in a plane beneath the plane in which the upper surface of the other connecting part lies. Also, that half of the suspension which is disposed to one side of the central longitudinal axis of the HSA and is located remotely from the center of the disk in the HDD is stiffer than the other half of the suspension which is proximal the center of the disk. To this end, the suspension includes at least one side-rail that renders the suspension asymmetrical.

10 Claims, 7 Drawing Sheets

CENTER OF DISK

HEAD STACK ASSEMBLY WITH SUSPENSION SUPPORTING HEAD SLIDER AND HARD DISC DRIVE INCLUDING THE SAME

BACKGROUND OF THE INVENTION

1. Field of the Invention

The present invention relates to a hard disk drive (HDD). More particularly, the present invention relates to a head stack assembly (HSA) of an HDD.

2. Description of the Related Art

A hard disk drive (HDD) is a device used in personal computers (PCs), MP3 players, mobile phones, and the like to store and retrieve data. To this end, an HDD includes a data storage disk, a spindle motor for rotating the disk, and a magnetic head that reads and writes data from and onto the disk. The head is embedded in a head slider, and when the HDD is operating, the head slider floats a predetermined distance above the disk while the disk is rotated by the spindle motor. The head slider is part of a head stack assembly (HSA) which is controlled to move the magnetic head over specified tracks of the disk. The tracks extend along concentric circles, respectively, whose centers coincide with the center of the disk.

The HSA also includes a swing arm that moves the head slider to a location over a specified track of the disk, and a suspension to which the head slider is mounted. The suspension supports the head slider during a read/write operation and maintains the spacing between the head slider and the recording surface of the disk. However, the magnetic head may deviate laterally from a specified track due to vibrations in the disk or the HSA. Such vibrations may be created when the HDD is disturbed or when the spindle motor of the HSA is running. This malfunction is referred to as the magnetic head being "off-track". FIG. 1 is a conceptual diagram illustrating an off-track state which may arise when the disk of the HDD is vibrating, and FIG. 2 is a conceptual diagram illustrating an off-track state which may arise when the suspension bends due to vibrations.

Referring to FIG. 1, a magnetic head h0 of a head slider 27 and a specific track T of a disk 10 are located at vertically aligned positions h0(d0), T(d0), respectively, when a read/write operation begins. Therefore, at this time, the magnitude of the off-track state of the magnetic head h0 is 0. However, the outer circumference of the disk 10 and the head slider 27 of the HSA vibrate up and down, as illustrated by dotted lines, when the HDD vibrates at a specific frequency. As a result, the magnetic head h0 becomes misaligned with the track T of the disk 10, i.e., the magnetic head h0 runs 'off-track due to disk vibration'. More specifically, the track T is displaced radially outwardly from position T(d0) to position T(d1) when the disk 10 moves downwards while vibrating. As a result, the suspension undergoes torsion and thereby displaces the magnetic head h0 radially inwardly from position h0(d0) to position h0(d1). On the other hand, the track T is displaced radially inwardly from position T(d0) to position T(d2) when the disk 10 move upwards while vibrating. In this case, the twisting of the suspension displaces the magnetic head h0 radially outwardly from position h0(d0) to position h0(d2). Therefore, the magnetic head h0 runs off-track when the head slider 27 moves upwardly or downwardly along with the vertical movement of the outer circumferential portion of the disk 10.

U.S. Pat. Nos. 6,920,018 and 6,958,879 disclose HSAs aimed at reducing the amount by which the magnetic head runs off-track due to disk vibration. To this end, the HSA has a suspension and a connection plate attached at a specific bias angle, or a plurality of members of different thicknesses connecting the suspension and the connection plate. An HSA according to this prior art can reduce the amount by which the magnetic head would otherwise run off-track due to disk vibration because the HSA moves the head slider radially outwardly when the head slider moves downwards and the suspension undergoes torsion, and moves the head slider radially inwardly when the head slider moves upwards and the suspension undergoes torsion.

However, the HSAs disclosed in the prior art can not suppress the tendency of the magnetic head to run off-track when vibrations transmitted to the suspension cause the suspension to bend up and down. That is, referring to FIG. 2, a suspension 25 of the HSA may vibrate up and down irrespective of the disk. In this case, the head slider 27 connected to the suspension 25 also vibrates up and down, resulting in the magnetic head running 'off-track due to suspension bending'. More specifically, the bending of the suspension 25 as it vibrates causes the suspension to become alternately convex and concave. The magnetic head of the head slider 27 is displaced towards the center of the disk 10 (from position h0(s0) to position h0(s1)) when the suspension 25 becomes convex. As a result, the magnetic head runs on one side of the desired track T. On the other hand, the magnetic head of the head slider 27 is displaced towards the outer circumference of the disk 10 (from position h0(s0) to position h0(s2)) when the suspension 25 becomes concave. As a result, the magnetic head also runs on the other side of the desired track T.

SUMMARY OF THE INVENTION

An object of the present invention is to provide a head stack assembly (HSA) which minimizes the extent to which the magnetic head runs off-track due to disk vibration and due to suspension bending.

Likewise, another object of the present invention is to provide a hard disk drive (HDD) whose magnetic head will hardly run off-track when vibrations are induced in the HDD.

Another object of the present invention is to provide a hard disk drive (HDD) that can process data at high speeds.

Still another object of the present invention is to provide an HDD that can function well with a disk having a high number of tracks per inch (TPI).

According to an aspect of the present invention, there is provided an HSA comprising a swing arm having an axis of rotation, a connection plate integral with the swing arm at a terminal end of the swing arm, a suspension attached to the connection plate, a head slider mounted to a terminal end of the suspension and having a read/write head for reading/writing data from/onto a data storage disk, and wherein the suspension has characteristics which minimize the degree to which the magnetic head will run off-track due to disk vibration and suspension bending. To this end, the suspension includes a main arm, and (at least) first and second connecting parts extending from a rear end of the main arm towards the connection plate. The first and second connecting parts are attached at different heights to the connection plate such that an upper surface of the first connecting part lies in a plane beneath that in which an upper surface of the second connecting part lies. Also, that half of the suspension which includes the second connecting part is stiffer than that half of the suspension which includes the first connecting part.

According to another aspect of the present invention, there is provided an HDD comprising a base, a spindle motor mounted to the base, a disk fixed to the spindle motor so as to be rotated by the spindle motor, and a head stack assembly (HSA) supported by the base, wherein the HSA has the features mentioned above. In particular, the first connecting part is disposed closer to the center of the disk than the second connecting part. Thus, the upper surface of the first connecting part lies in a plane beneath that in which the upper surface of the second connecting part lies. Also, the half of the suspension which is remotely from the center of the disk is stiffer than the half of the suspension which is disposed proximal the center of the disk.

According to another aspect of the invention, the connection plate may have different thicknesses at respective corners thereof. In this case, the connecting parts of the suspension are directly attached to the corners so as to provide the difference in height at the points of attachment of the connecting parts. Alternatively, a spacer may be interposed between (at least) one of the connecting parts and the connection plate in order to provide the difference in height at the points of attachment of the connecting parts.

According to still another aspect of the invention, the suspension may comprise at least one side-rail that accounts for the difference in stiffness between the respective halves of the suspension.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

Figure 1:
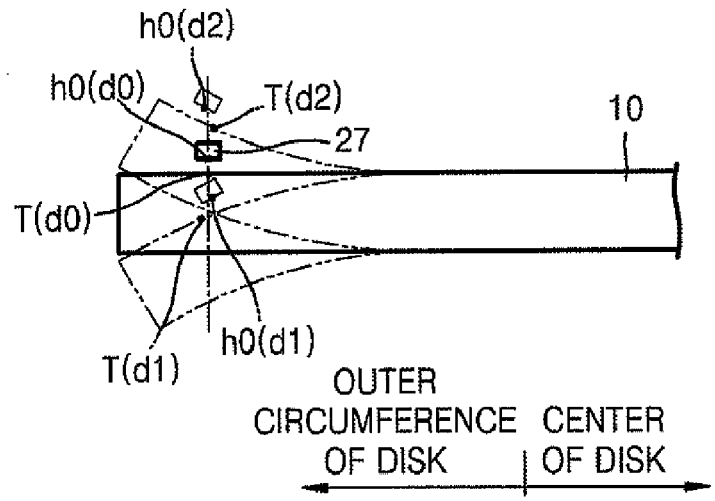
FIG. 1 is a conceptual diagram illustrating an off-track state of a magnetic head caused by vibrations of a data storage disk.
Figure 2:
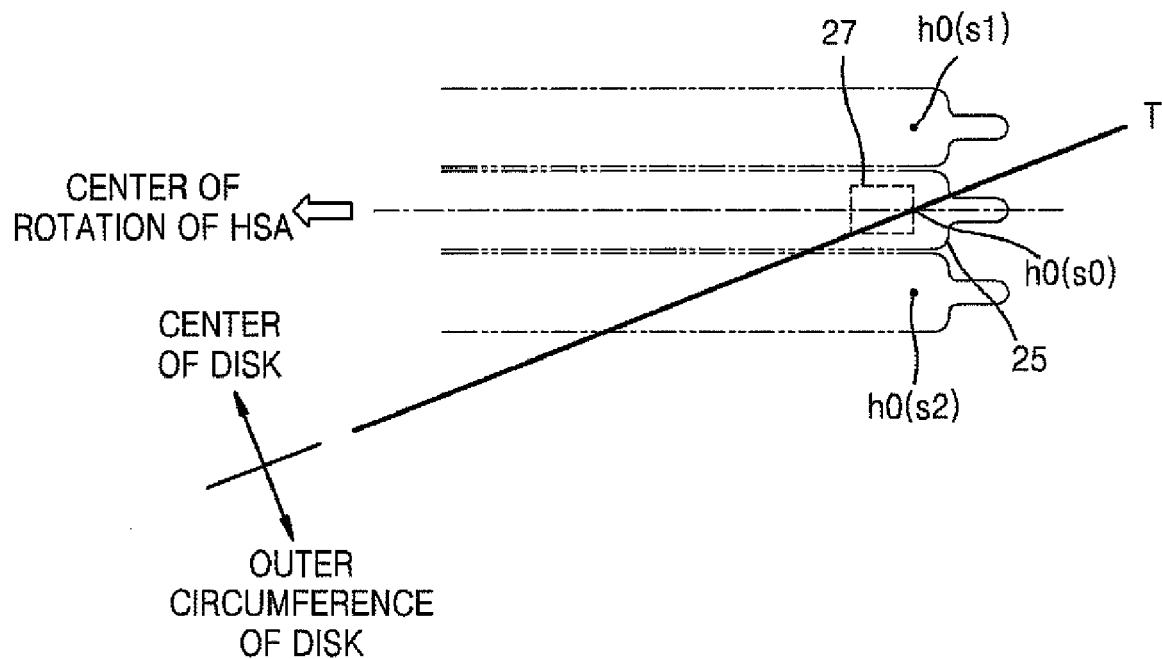
FIG. 2 is a conceptual diagram illustrating an off-track state of a magnetic head caused by the bending of a suspension to which the head is attached.
Figure 3:
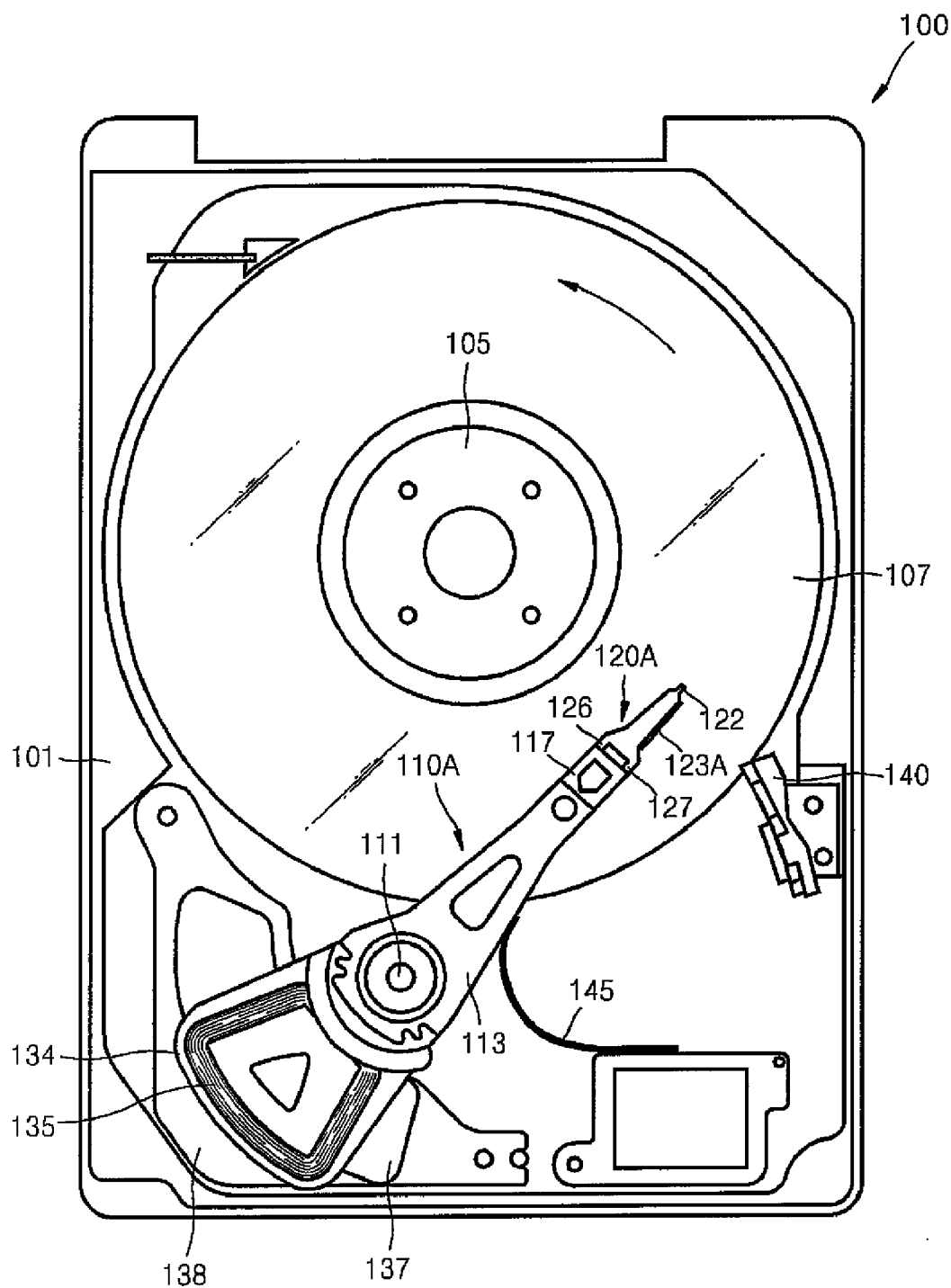
FIG. 3 is a plan view of an HDD according to the present invention.
Figure 4:
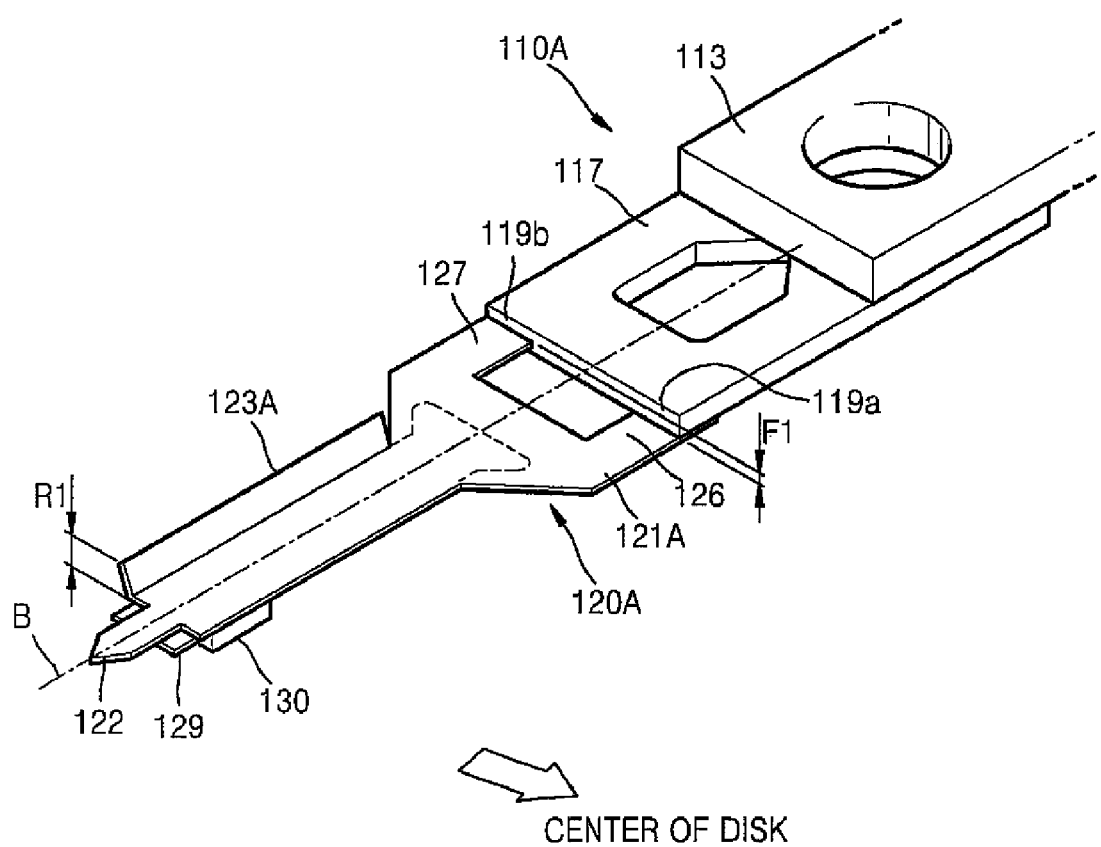
FIG. 4 is a perspective partial view of an embodiment of an HSA according to the present invention.

Referring to FIGS. 3 and 4, an HDD 100 according to the present invention includes a base 101, a spindle motor 105, a data storage disk 107, and an HSA 110A. Also, a cover (not shown) is coupled to the base 101 to form a housing in which the spindle motor 105, disk 107, and HSA 110A are enclosed. The spindle motor is fixed to the base 101 within the housing. The data storage disk 107 is mounted to the spindle motor 105 such that the spindle motor 105 rotates the disk 107 at a high speed in the direction of the arrow in FIG. 3. The HDD 100 also includes a main printed circuit board (PCB, not shown) disposed below the base 101, and a flexible printed circuit (FPC) 145 which electrically connects the HSA 110A to the main PCB.

The HSA 110A includes a head slider 130 having an embedded magnetic head for reading/writing data. The head slider 130 is positioned over a specific track of the disk 107 to read or write data from or onto the disk 107. To this end, the HSA 110A also includes a swing arm 113 mounted to the base 101 by a bearing 111 so as to be rotatable about a central (vertical) longitudinal axis of the bearing 111, a connection plate 117 attached to a terminal end of the swing arm 113, and a suspension 120A attached to the connection plate 117. The head slider 130 is attached to a free end of the suspension 120A so as to move with the swing arm 113. Also, the suspension 120A biases the head slider 130 towards the disk 107.

The swing arm 113 of the HSA 110A also includes a coil support 134. A voice coil 135 is wound around the coil support 134. A respective magnet 137 and yoke 138 supporting the magnet 137 are disposed above and below the coil support 134. The magnets 137, the yokes 138, and the voice coil 135 of the HSA 110A form a voice coil motor for rotating the swing arm 113 of the HSA 110A about the central longitudinal axis of the bearing 111.

The high-speed rotation of the disk 107 induces an air flow, in the direction of the arrow in FIG. 3, on the surface of the disk 107. Lift is exerted on the head slider 130 when the air flow passes between the disk 107 and the head slider 130. As a result, the head slider 130 floats above the disk 107 at a position at which the lift exerted on the head slider 130 is equal to the biasing force exerted on the head slider 130 by the suspension 120A. The magnetic head of the head slider 130 reads and writes data from and onto the disk 107 while floating in this way above the disk 107.

The HDD 100 also includes a ramp 140 on which the swing arm 130 of the HSA 110A is parked when a read/write operation is over, i.e., when the HDD 100 is not operating. In this case, the swing arm 113 of the HSA 110A is rotated clockwise by the voice coil motor. As a result, the head slider 130 is moved off of the disk 107, and an end-tab 122 of the suspension 120A is slid along the ramp 140. The swing arm 130 is stopped once the end-tab 122 is located in a safety zone (not shown) of the ramp 140. In this parked state, the swing arm 130 of the HSA 110A is fixed in position and will not rotate even when the HDD is disturbed.

The connection plate 117 of the HSA 110A connects the suspension 120A to the end of the swing arm 113. In this respect, the connection plate 117 can be formed by swaging. The suspension 120A includes a load beam 121A attached to the connection plate 117A, and a flexure 129 attached to the load beam 121A. The flexure 129 supports the head slider 130 such that the head slider 130 faces the disk. The load beam 121A consists of a plate having a uniform thickness. The end-tab 122 is formed at a terminal distal end of the load beam 121A.

The load beam 121A includes a pair of connecting parts 126 and 127 attached to the connection plate 117 on opposite sides of the central longitudinal axis B of the HSA (FIG. 4). The central longitudinal axis B lies in a plane coincident with the axis of rotation of the swing arm 113 and bisecting the head slider 130. Although not shown, the load beam 121A may also have a third connecting part located between the first connecting part 126 and the second connecting part 127. The first connecting part 126 is attached directly to the bottom surface of the connection plate 117 at a first corner 119a of the connection plate 117, and the second connecting part 127 is attached directly to the bottom surface of the connection plate 117 at a second corner 119b of the connection plate 117 which is further from the center of the disk 107 than the first corner 119a. Also, as illustrated in FIG. 4, the connection plate 117 is thicker at its first corner 119a than at its second corner 119b. Therefore, the first connecting part 126 is lower than the second connecting part 127. In particular, the upper surface of the first connecting part 126 lies in a plane spaced by a predetermined vertical distance F1 below the plane in which the upper surface of the second connecting part 127 lies. The distance F1 is preferably between 0 and 0.5 mm.

Figure 5:
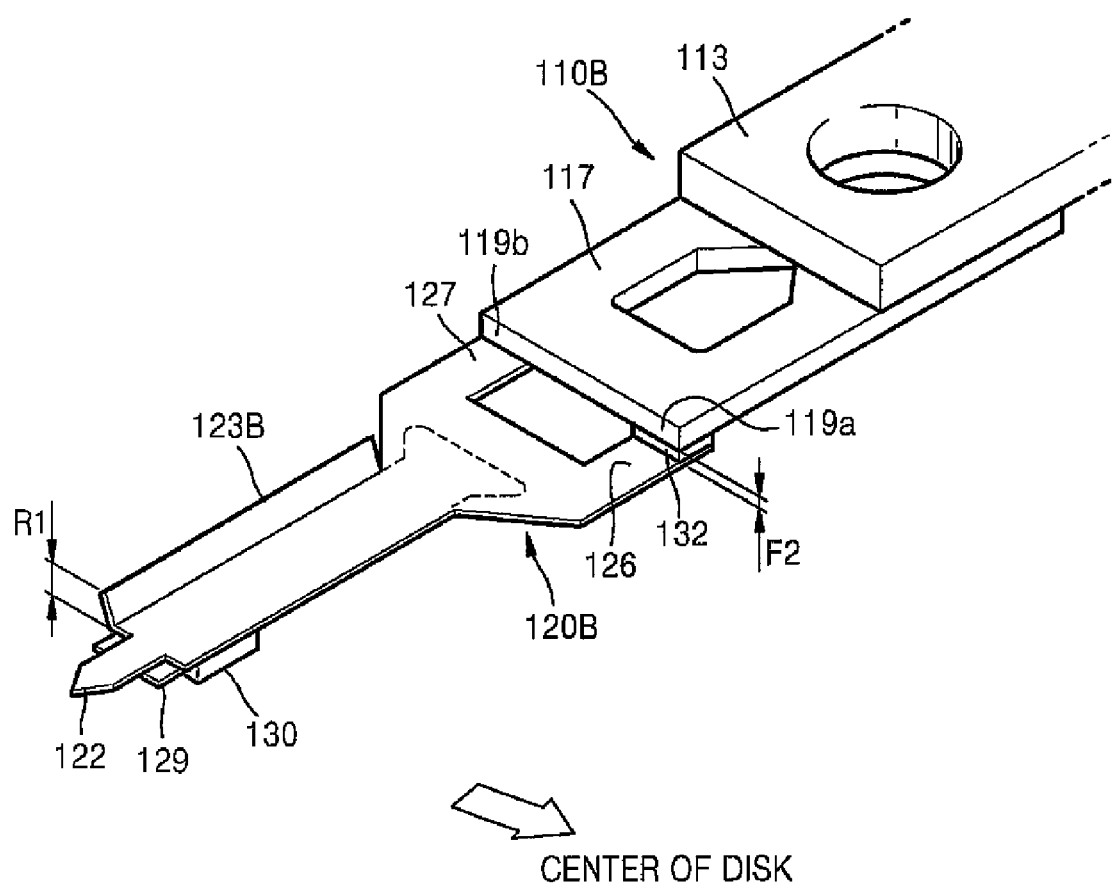
FIG. 5 is a perspective partial view of another embodiment of an HSA according to the present invention.

FIG. 5 illustrates another embodiment of an HSA 110B according to the present invention. In this embodiment, the connection plate 117 has a uniform thickness. In particular, the thickness of the connection plate 117 at the first corner 119a thereof is equal to the thickness of the connection plate 117 at the second corner 119b. The HSA 110B of the embodiment of FIG. 5 also includes a spacer 132 interposed between the first connecting part 126 and the connection plate 117, in order to situate the first connecting part 126 in a plane beneath that of the second connecting part 127. More specifically, the spacer 132 is attached to the bottom of the connection plate 117 at the first corner 119a thereof, the first connecting part 126 is attached to the bottom surface of the spacer 132, and the second connecting part 127 is attached to the bottom surface of the connection plate 117 at the second corner 119b thereof. As a result, the upper surface of the first connecting part 126 lies in a plane spaced by a predetermined vertical distance F2 below the plane in which the upper surface of the second connecting part 127 lies. The distance F2 is equal to the thickness of the spacer 132 and is preferably between 0 and 0.5 mm.

Alternatively, the connecting parts 126 and 127 of the suspension 120 may be attached to the top surface of the connection plate 117 in such a way that the upper surface of the first connecting part 126 lies in a plane spaced by a predetermined vertical distance F1 below the plane in which the upper surface of the second connecting part 127 lies. For instance, a spacer similar to the spacer 132 shown in FIG. 5 may be interposed between the second connecting part 127 and the connection plate 117, the second connecting part 127 may be attached to the upper surface of the spacer, and the first connecting part 126 may be attached to the upper surface of the connection plate 117.

Referring back to FIGS. 3 and 4, the load beam 121A of the suspension 120A also includes a main arm from which the connecting parts 126 and 127 extend rearwards and from which the lift-tab 122 extends forward, and a side-rail 123A bent upward at an angle from the central portion of the main arm so as to have a height R1. The side-rail 123A extends along only one side of the load beam 121A, namely, the side of the main arm of the load beam 121A which is remote from the center of the disk 107. Similarly, in the embodiment of FIG. 5, the suspension 120B includes a load beam and a flexure 129. The load beam includes a side-rail 123B extending along only the side thereof which is remote from the center of the disk 107.

Accordingly, the suspension 120A (120B) is asymmetrical and thus, the stiffness of the suspension 120A (120B) varies on opposite sides of the central longitudinal axis B of the HSA 110A (110B). In particular, the stiffness of the portion of the suspension 120A (120B) having the side-rail 123A (123B) and located to one side of the central longitudinal axis B of the HSA 110A (110B) is greater than the stiffness of the portion of the suspension 120A (110B) located to the side of the central longitudinal axis B of the HSA 110A (110B). The asymmetric stiffness of the suspension 120A (120B) causes the head slider 130 to move towards or away from the center of the disk 107 when the suspension 120A (120B) bends.

Figure 6:
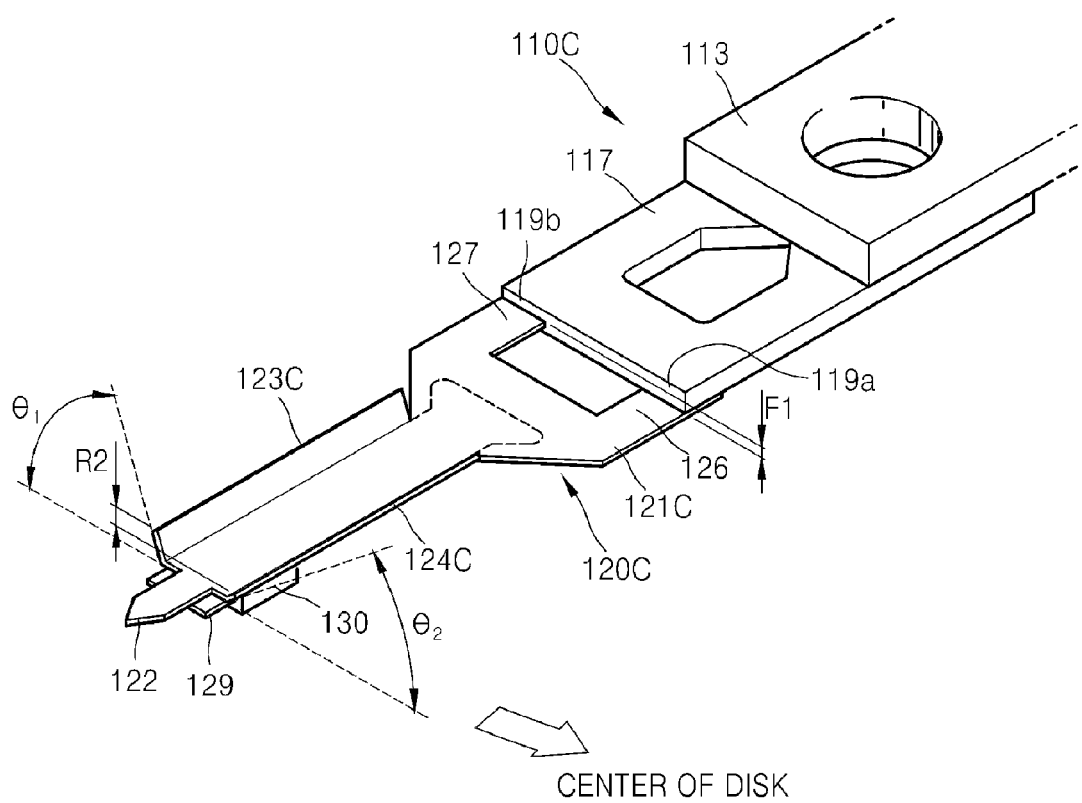
FIG. 6 is a perspective partial view of still another embodiment of an HSA according to the present invention.

FIG. 6 illustrates another embodiment of an HSA 110C according to the present invention. In this embodiment, the suspension 120C of the HSA 110C includes a load beam 121C having a first side-rail 123C extending along the side thereof which is remote from the center of the disk 107, and a second side-rail 124C extending along the side of the load beam 121C which is proximal the center of the disk 107. The second side-rail 124C is shorter than the first side-rail 123C. Also, the angle subtended by the first side-rail 123C and the main arm, as represented by $\theta_1$ in the figure, may differ from the angle (represented by $\theta_2$) subtended between the second side-rail 124C and the main arm. On account of the side rails 123C and 124C, the stiffness of that longitudinal half of the suspension 120C which includes the first side-rail 123C is greater than the stiffness of that longitudinal half of the suspension 120C which includes the second side-rail 124C. The asymmetric stiffness of the suspension 120C causes the head slider 130 to move towards or away from the center of the disk 107 when the suspension 120C bends.

The present inventors conducted computer simulations of HDDs in order to verify the effectiveness of the present invention in minimizing the amount by which a magnetic head will run off-off track when various types of vibrational disturbances occur in an HDD. The HDDs were modeled by the computer simulations so as to each have a 2.5-inch diameter disk. Also, the HDDs were modeled to include, respectively, an HSA having both a first characteristic of the embodiment of FIG. 4, namely a load beam in which the first connecting part is lower by 0.1 mm than the second connecting part, and a second characteristic of the embodiment of FIG. 4, namely a load beam in which a side-rail extends along only the side of the suspension which is remote from the center of the disk 107 (hereinafter, a first type of HSA); an HSA having only the first characteristic (hereinafter, a second type of HSA); and a conventional HSA having neither the first characteristic nor the second characteristic (hereinafter, a third type of HSA).

Figure 7:
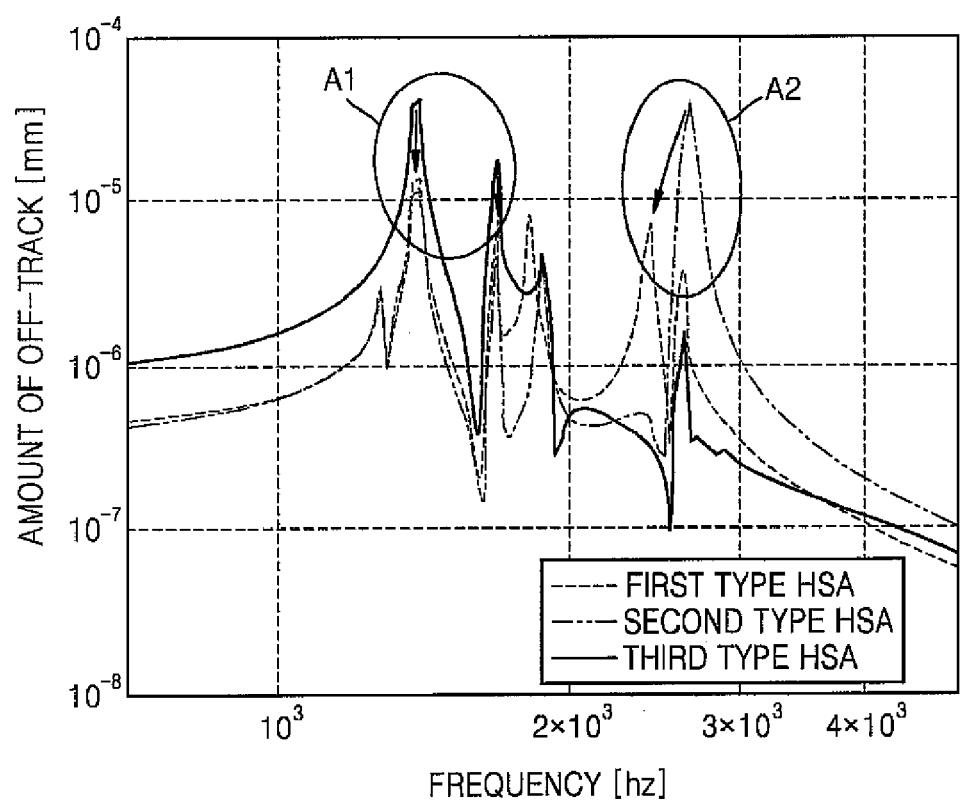
FIG. 7 is a graph illustrating the correlation between frequency of vibrations of an HDD and the magnitude of the off-track state assumed by the magnetic heads of HSAs according to the prior art and the present invention, respectively.

FIG. 7 is a graph illustrating the correlation, obtained as a result of the computer simulations, between the frequency of vibrations applied to an HDD and the amount by which the magnetic head will run off-track. In FIG. 7, peaks formed in zone A1 indicate the occurrence of the off-track state due to disk vibration, and peak formed in zone A2 indicate the occurrence of the off-track state due to a bending of the suspension. Table 1 shows results taken from the graph of FIG. 7.

TABLE 1

|  | Amount of off-track due to disk vibration [×10⁻⁶ mm] | Amount of off-track due to suspension bending [×10⁻⁶ mm] |
| --- | --- | --- |
| First type HSA | 13.71 | 6.96 |
| Second type HSA | 12.47 | 38.93 |
| Third type HSA | 44.29 |  |

As can be seen from Table 1, the amounts by which the magnetic heads of the first and second type of HSAs will run off-track are about ⅓ to ¼ the amount by which the third type of HSA will run off-track due to disk vibration. In addition, the amount by which the magnetic head of the first type of HSA will run off-track is about ⅙ the amount by which the second type of HSA will run off-track due to suspension bending.

Figure 8:
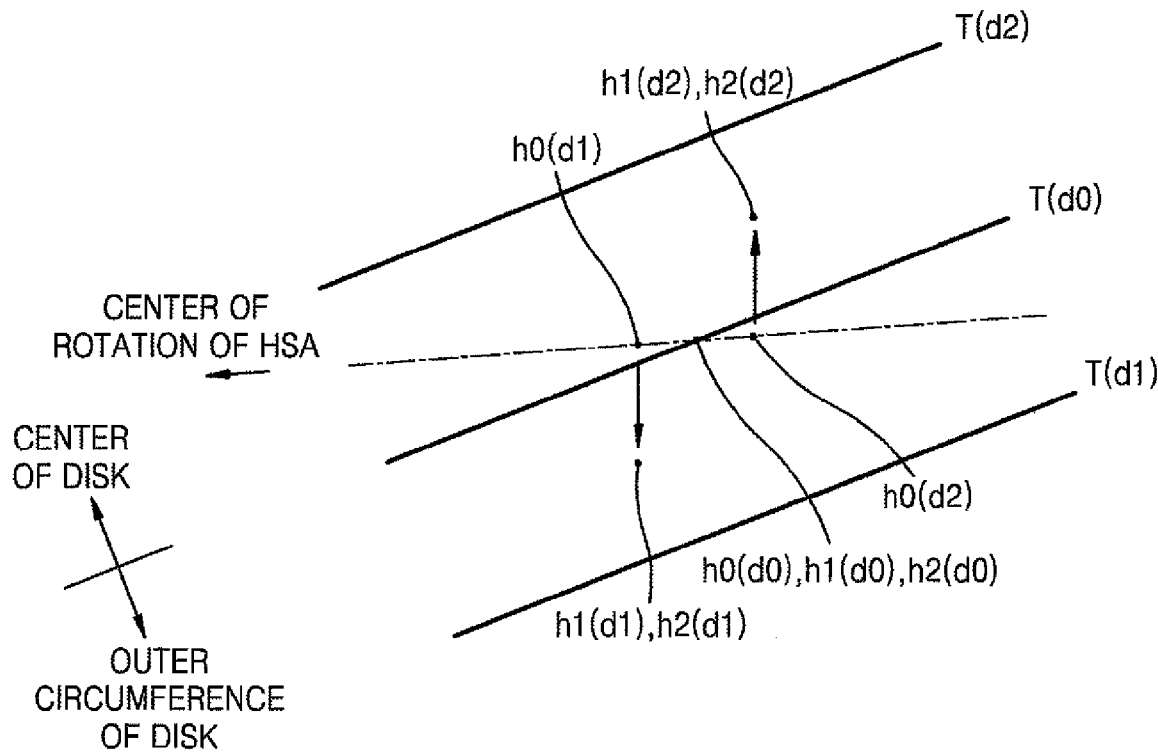
FIG. 8 is a conceptual diagram illustrating the effect of the present invention in reducing the off-track state due to disk vibration.

FIG. 8 is a conceptual diagram for use in explaining the effectiveness of the present invention in minimizing the amount by which the magnetic head will run off-track due to disk vibration. In FIG. 8, reference character T designates a track of a disk from or onto which data is to be read or written. Reference character h0 designates the magnetic head of the third type of HSA, i.e., an HSA according to the prior art. Reference character h1 designates a magnetic head of the first type of HSA, i.e., an HSA according to the present invention, and reference character h2 designates a magnetic head of the second type of HSA.

Referring now to FIG. 8, when the outer circumference of a disk moves downwards while vibrating, a track T of the disk is displaced towards the outer circumference of the disk (from T(d0) to T(d1)). On the other hand, when the outer circumference of the disk moves upwards while vibrating, the track T is displaced towards the center of the disk (from T(d0) to T(d2)). Also, during this time, the magnetic head remains spaced a predetermined distance from the surface of the disk due to the biasing force exerted thereon by the suspension of the HSA. That is, the magnetic head moves upward and downward with the vibrating disk.

In the case of the third type of HSA (the HSA of the prior art), when the outer circumference of the disk moves downwards while vibrating, the magnetic head h0 is displaced towards the center of rotation of the HSA (from h0(d0) to h0(d1)). As a result, the magnetic head h0 runs off-track by an amount corresponding to the distance between the magnetic head h0 and the track T (the radial distance between h0(d1) and T(d1)). Likewise, when the disk moves upwards, the magnetic head h0 is displaced away from the center of rotation of the HSA (from h0(d0) to h0(d2)). As a result, the magnetic head h0 runs off-track by an amount corresponding to the distance between the magnetic head h0 and the track T (the radial distance between h0(d2) and T(d2)).

However, in the first type HSA or the second type HSA, the suspension is distorted when the HSA moves up and down because of the differences in the stiffness of the suspension on opposite sides of the central longitudinal axis of the HSA. Therefore, when the outer circumference of the disk moves downwards, the magnetic head h1 or h2 of the HSA is displaced towards the center of rotation of the HSA and is biased towards the outer circumference of the disk (from h1(d0) to h1(d1) or from h2(d0) to h2(d1)). Similarly, when the outer circumference of the disk moves upwards, the magnetic head h1 or h2 moves in the opposite direction (from h1(d0) to h1(d2) or from h2(d0) to h2(d2)). As can be seen from FIG. 8, the distances between the magnetic head and the track (i.e., the radial distances between h1(d1) and T(d1), between h1(d2) and T(d2), between h2(d1) and T(d1), and between h2(d2) and T(d2)) are shorter than those which occur in the third type of HSA under the same circumstances which give rise to the off-track state. This shows that the present invention is effective in reducing the extent to which the magnetic head will run off-track due to disk vibration.

Figure 9:
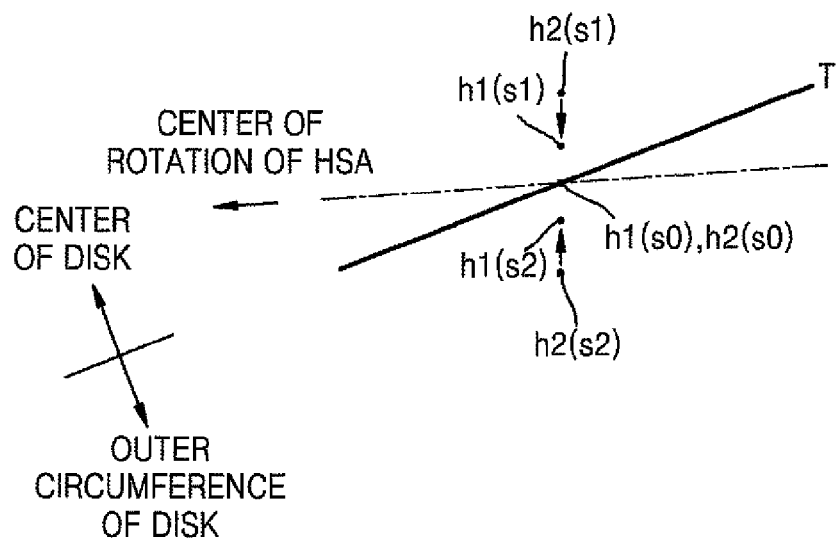
FIG. 9 is a conceptual diagram illustrating the effect of the present invention in reducing the off-track state due to suspension bending.

FIG. 9 is a conceptual diagram for use in explaining the effectiveness of the present invention in minimizing the amount by which the magnetic head will run off-track due to the bending of the suspension independently of any vertical fluctuations in the surface of the disk (simply referred to as suspension bending). Referring to FIG. 9, if suspension bending occurs in the second type of HSA such that the suspension becomes convex, the suspension distorts due to the differences in the stiffness of the suspension on opposite sides of the central longitudinal axis of the HSA. Accordingly, the magnetic head h2 is displaced by the suspension towards the center of the disk (from h2(s0) to h2(s1)). Likewise, if suspension bending occurs in the second type of HSA such that the suspension becomes concave, the magnetic head h2 is displaced by the suspension towards the outer circumference of the disk (from h2(s0) to h2(s2)). Thus, the magnetic head runs off-track by an amount corresponding to the (radial) distance between h2(s1) and T or h2(s2) and T.

However, if suspension bending occurs in the first type of HSA, the magnetic head h1 is displaced (from h1(s0) to h1(s1) or from h1(s0) to h1(s2)). In this case, the second characteristic of the first type of HSA offsets the tendency of the magnetic head to be displaced towards the center of the disk due to the first characteristic. Thus, the distances between the magnetic head h1 of the first type HSA and the track T (i.e., the radial distances between h1(s1) and T or between h1(s2) and T) are shorter than those (i.e., between h2(s1) and T or h2(s2) and T) that occur in the second type of HSA under the same circumstances. That is, the amount by which the magnetic head runs off-track due to suspension bending is less in the first type of HSA than in the second type of HSA.

As described above, according to the present invention, the amounts by which a magnetic head will run off-track in an HSA due to disk vibration and suspension bending are minimized. Therefore, the present invention provides for improved positioning of the read/write head, minimizes the generation of Positioning Error Signals (PES) and hence, provides for increased data processing speeds. In addition, the present invention allows for data to be read from and written onto a disk having a relative large number of tracks per inch (TPI), i.e., enables an HDD to have a highly integrated disk.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A head stack assembly (HSA) comprising:
   a swing arm having an axis of rotation about which the swing arm is to rotate in a hard disk drive (HDD);
   a connection plate integral with the swing arm at a terminal end of the swing arm;
   a suspension attached to the connection plate;
   a head slider mounted to a terminal end of the suspension and having a read/write head for reading/writing data from/onto a data storage disk, and
   wherein the suspension includes a load beam and a flexure extending from the bottom of the load beam and supporting the head slider,
   the load beam comprises a main arm, first and second side rails extending along opposite sides of the main arm, and first and second connecting parts extending from a rear end of the main arm towards the connection plate, the first and second connecting parts being located on opposites sides of a central longitudinal axis of the HSA, the central longitudinal axis lying in a plane coincident with the axis of rotation of the swing arm and bisecting the head slider, the first and second connecting parts having attaching surfaces at which the connecting parts are attached to the connection plate, respectively, the attaching surface of the first connecting part lying in a plane beneath that in which the attaching surface of the second connecting part lies,
   the first side-rail extends alongside the main arm at that portion of the suspension which is disposed on said one side of the central longitudinal axis, the second side-rail extends alongside the main arm at that portion of the suspension which is disposed on said other side of the central longitudinal axis, and the first and second side-rails are each inclined relative to the main arm of the load beam and subtend different angles with the main arm, and that portion of the suspension which is disposed on one side of the central longitudinal axis and includes the second connecting part is stiffer, on account of said side rails, than that portion of the suspension which is disposed on the other side of the central longitudinal axis and includes the first connecting part.

2. The HSA of claim 1, wherein the attaching surfaces of the first connecting part and the second connecting part are the upper surfaces of the first connecting part and the second connecting part.

3. The HSA of claim 1, wherein the connection plate has first and second corners, and the first and second connecting parts of the suspension are attached directly to the first and second corners of the connection plate, respectively.

4. The HSA of claim 3, wherein the thickness of the connection plate at the first corner thereof is different than the thickness of the connection plate at the second corner thereof.

5. The HSA of claim 1, further comprising a spacer interposed between the attaching surface of one of the connecting parts and the connection plate.

6. A hard disk drive (HDD) comprising:
a base;
a spindle motor mounted to the base;
a disk fixed to the spindle motor so as to be rotated by the spindle motor; and
a head stack assembly (HSA) supported by the base, the HSA comprising a swing arm mounted to the base so as to be rotatable relative to the base about an axis of rotation,
a connection plate integral with the swing arm at a terminal end of the swing arm,
a suspension attached to the connection plate,
a head slider mounted to a terminal end of the suspension and having a read/write head for reading/writing data from/onto the disk, and
wherein the suspension includes a load beam and a flexure extending from the bottom of the load beam and supporting the head slider, the load beam comprises a main arm, first and second side rails extending along opposite sides of the main arm, and first and second connecting parts extending from a rear end of the main arm towards the connection plate, the first and second connecting parts being located on opposites sides of a central longitudinal axis of the HSA, the central longitudinal axis lying in a plane coincident with the axis of rotation of the swing arm and bisecting the head slider, the first and second connecting parts having attaching surfaces at which the connecting parts are attached to the connection plate, respectively, the first connecting part being disposed closer to the center of the disk than the second connecting part, the attaching surface of the first connecting part lying in a plane beneath that in which the second connecting part lies, the first side-rail extends alongside the main arm at that portion of the suspension which is disposed on said one side of the central longitudinal axis, the second side-rail extends alongside the main arm at that portion of the suspension which is disposed on said other side of the central longitudinal axis, and the first and second side-rails are each inclined relative to the main arm of the load beam and subtend different angles with the main arm, and that portion of the suspension which is disposed on one side of the central longitudinal axis remotely from the center of the disk is stiffer, on account of said side rails, than that portion of the suspension which is disposed on the other side of the central longitudinal axis proximal the center of the disk.

7. The HDD of claim 6, wherein the attaching surfaces of the first connecting part and the second connecting part are the upper surfaces of the first connecting part and the second connecting part.

8. The HDD of claim 6, wherein the connection plate of the HSA has first and second corners, and the first and second connecting parts of the suspension are attached directly to the first and second corners of the connection plate, respectively.

9. The HDD of claim 8, wherein the thickness of the connection plate at the first corner thereof is different than the thickness of the connection plate at the second corner thereof.

10. The HDD of claim 6, wherein the HSA further comprises a spacer interposed between the attaching surface of one of the connecting parts and the connection plate.

* * * * *